UNITED STATES PATENT OFFICE.

BENJAMIN A. PEACOCK, OF PHILADELPHIA, PENNSYLVANIA, ASSIGNOR, BY MESNE ASSIGNMENTS, TO ROBERT GILCHRIST, OF NEW YORK, N. Y.

PROCESS OF DECOMPOSING NATURAL SILICATES.

1,310,770. Specification of Letters Patent. Patented July 22, 1919.

No Drawing. Application filed August 30, 1917. Serial No. 188,999.

*To all whom it may concern:*

Be it known that I, BENJAMIN A. PEACOCK, a citizen of the United States, residing at Philadelphia, in the county of Philadelphia and State of Pennsylvania, have invented certain new and useful Improvements in Processes of Decomposing Natural Silicates; and I do hereby declare the following to be a full, clear, and exact description of the invention, such as will enable others skilled in the art to which it appertains to make and use the same.

This invention relates to a process for decomposing potassium bearing silicates with the aid of sulfuric acid and has for its object to improve the processes of this nature which have been heretofore proposed.

With this and other objects in view the invention consists in the novel steps and combinations of steps constituting the process, all as will be more fully hereinafter disclosed and particularly pointed out in the claims.

As is well known, naturally occurring potassium silicates such as feldspar, leucite, glauconite, etc., when heated with sulfuric acid under pressure in a closed vessel to a temperature materially above 100° C. are decomposed with the formation of alkali metal sulfates and other compounds, while if the containing vessel be not closed the said sulfuric acid will be boiled off, and no such compounds will be formed to any useful degree, even if the temperatures are the same in the two cases. But heating such a mixture of sulfuric acid and rock in an autoclave is not at present practicable owing to the fact that the acid will destroy the vessel and no satisfactory acid resisting material is at present known to remedy its action.

In carrying out this invention I avoid the above objections by proceeding as follows:—

I finely divide the rock material, mix with the same a suitable quantity of lime or calcium oxid, and add sufficient sulfuric acid to form a thick mud. This mixture being inclosed in a chamber or "den" made sufficiently strong to resist the pressure to be developed, the acid is enabled through its reaction with the lime to develop enough heat to raise the mass to say 150° C. or 200° C. or sufficiently high to cause the decomposition of the rock material and the formation of alkali-metal sulfates. The above mentioned "den" or reaction chamber is a well known covered construction usually made of strong stone or brick walls with heavy plank boards somewhat after the fashion of a silo. It is usually filled rapidly with the mixture in the shape of mud and as the reaction proceeds, the heat gets higher and the pressure often rises to a very high point indeed. This said pressure I call "mass pressure" for it is caused by the hydrostatic pressure of the semi-liquid mass confined in the den which may be say 10 to 25 feet deep, and is aided by the expanding mass as well as by the viscosity of the material which tends to prevent the free escape of the generated gases and vapors. This pressure is amply sufficient at the temperature in the lower part of the den, free sulfuric acid being present, to prevent the escape of said acid, so that the latter can be readily maintained in excess of the quantity required to react on both the lime and rock material present.

But if ordinary lime is used in the reaction, sulfate of calcium is formed, and sulfuric acid is consumed to no commercial purpose, for calcium sulfate is of little industrial value. Therefore, I may add phosphate rock to the charge whereupon although the calcium combined with the phosphorus is converted into a sulfate, yet the phosphoric acid present is made soluble and of an industrial value so that a by-product is had to compensate for the loss of sulfuric acid.

Instead of adding phosphate rock to the charge, a still more valuable by-product may be produced as follows:—

I may mix serpentine rock, dunite or other magnesium silicate and a potassium bearing silicate in a finely divided condition and add to the same at least sufficient sulfuric acid of from say 45° to 55° Be., to convert substantially all the potassium and magnesium present into sulfates. Serpentine, dunite and other hydrous magnesium silicates are attacked by sulfuric acid in the cold, but glauconite and hydrous silicates containing potassium are not attacked with a velocity sufficient for industrial purposes until heated to say 150° C. or 200° C. or higher. Therefore, by treating a mixture of the two silicates with sulfuric acid at ordinary temperatures, the magnesium silicate is first attacked and the temperature of the mass thus readily brought up to say 200° C. when the potassium bearing silicates are decomposed. In such case a mass pressure is generated as is the case when lime is used, and after say 24 or 48 hours a double sulfate of potassium and magnesium may be recovered from the den or other suitable container.

The vessel being kept closed for say 24 or 48 hours, and the reaction products removed, the latter are sub-divided and said double sulfate extracted with water. The solution may now be evaporated, and said double sulfate allowed to crystallize out when it can be sold as a fertilizer.

But, I prefer to recover the magnesium present as follows:—

I digest said double sulfate with a solution of calcium chlorid to form a double chlorid of potassium and magnesium. I next digest this said double chlorid with slaked dolomite in such proportions as will form calcium chlorid and potassium chlorid in solution, and will precipitate not only the magnesium present in said double chlorid, but also that present in the dolomite in the form of a hydroxid. The solution is evaporated to crystallize out the chlorid of potassium, and the calcium chlorid is returned to the process.

It will now be clear that by mixing a hydrous alkaline-earth metal silicate with the hydrous potassium bearing silicate which contains an alkaline-earth metal such as calcium or magnesium in a state of combination, I am enabled, under pressure in a closed vessel, to cause sulfuric acid to decompose the silicate, and to so combine with the potassium and alkaline-earth metal present as to enable me to readily separate the latter from the residue. At the same time by employing a container of the nature of a den I avoid the attack of the acid on the walls which is experienced when a metal autoclave is used.

It is obvious that those skilled in the art may vary the details of the process without departing from the spirit of the invention, and therefore, I do not wish to be limited to the above disclosure except as may be required by the claims.

What I claim is:—

1. The process of decomposing an alkali metal silicate not readily attackable by sulfuric acid in the cold, which consits in mixing in a finely divided condition with said silicate a hydrous alkaline earth metal silicate capable of being readily attacked by sulfuric acid in the cold; adding to the mixture thus produced sufficient sulfuric acid to react with substantially all the alkaline earth metal present in the cold, and also sufficient to combine with substantially all the alkali metal present after the temperature of the mass has been raised by the first reaction; and confining the said mass in a closed heat insulated vessel until the reactions are substantially completed, substantially as described.

2. The process of decomposing a potassium bearing silicate which consists in mixing with said silicate in a finely divided condition a hydrous silicate mineral containing magnesium; adding to the mixture thus produced sufficient sulfuric acid to combine with all the potassium and magnesium present; and inclosing the reacting mass in a reaction chamber until the reaction has substantially ceased, substantially as described.

3. The process of decomposing a potassium bearing silicate which consists in mixing with said silicate in a finely divided condition a silicate mineral containing magnesium; adding to the mixture thus produced sufficient sulfuric acid to combine with all the potassium and magnesium present; inclosing the reacting mass in a reaction chamber until the reaction has substantially ceased; extracting the resulting double sulfate of potassium and magnesium with water; and suitably separating out the potassium present in a combined state, substantially as described.

4. The process of decomposing a potassium bearing silicate which consists in mixing with said silicate in a finely divided condition a hydrous silicate mineral containing magnesium; adding to the mixture thus produced sufficient sulfuric acid to combine with all the potassium and magnesium present; inclosing the reacting mass in a reaction chamber until the reaction has substantially ceased; recovering the double sulfate of magnesium and potassium formed; converting said sulfate into a double chlorid; adding a dolomite to the double chlorid thus obtained; digesting the mixture thus produced; and separating the combined potassium from the resulting combined magnesium present, substantially as described.

In testimony whereof I affix my signature, in presence of two witnesses.

BENJAMIN A. PEACOCK.

Witnesses:
RAYMOND HIGGINS,
WM. E. BLAIR.